United States Patent Office
2,827,415
Patented Mar. 18, 1958

2,827,415

HETEROCYCLIC COMPOUNDS

Wilfred Arthur Freeman, East Barnet, David Lord Pain, Rainham, and Ronald Slack, Chelsea, London, England, assignors to May & Baker Limited, Essex, England, a British company No Drawing. Application August 13, 1956
Serial No. 603,809

Claims priority, application Great Britain
August 15, 1955

8 Claims. (Cl. 167—33)

This invention is for improvements in or relating to heterocyclic compounds and more particularly to new and useful nitrosopyrazoles, a process for their production and fungicidal compositions containing them.

It is known that certain substituted 4-nitrosopyrazoles possess useful fungicidal and bactericidal properties. Such activity is not a characteristic common to 4-nitrosopyrazoles considered as a class but depends, as do other properties of the compounds, upon the nature and position of attachment of the one or more possible substituents. More specifically, it is well known that certain 1-aryl - 4 - nitrosopyrazoles, for example 1 - phenyl - 3:5- dimethyl-4-nitrosopyrazole and 1 - 4' - chlorophenyl-3:5- dimethyl-4-nitrosopyrazole, are highly active fungicides finding application in the field of plant protection but it is also well known that these compounds are severe skin-irritants which readily cause dermatitis in susceptible subjects (see for example, Martin H. and Miles, J. R. W., Guide to the Chemicals Used in Crop Protection, Department of Agriculture Science Service, Dominion of Canada).

It is the object of this invention to provide new 4-nitrosopyrazoles and fungicidal compositions containing them which are highly active fungicides and which are markedly less liable to cause dermatitis in susceptible subjects coming into contact with them than hitherto used nitrosopyrazoles and fungicidal compositions containing them.

The compounds of the present invention are the 1-cyclopentyl - 1 - cyclohexyl- and 1 - cycloheptyl - 3:5- dimethyl - 4 - nitrosopyrazoles which can be represented by the conventional formula:

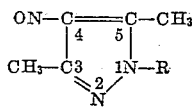

where R represents the cyclopentyl, cyclohexyl or cycloheptyl radical.

These new compounds are very active fungicides and are especially valuable in the prevention and treatment of diseases of plants caused by pathogenic fungi. Consequently they may be used as foliage protectants, seed dressings or in the protection of plants against attack by mildew. In particular, they are active against the chocolate spot fungus of broad beans (*Botrytis cinerea*), *Sclerotinea laxa* and *Venturia inaequalis*. They are also active against fungi pathogenic to humans and animals and may be used in the topical treatment of infections such as ringworm caused by, for example, the following dermatophytes: *Microsporum canis* and *Trichophyton tonsurans, discoides, quinckeanum, interdigitalis, mentagrophytes, violaceum* and *schoenleini*.

Comparative experiments in which both compounds of the invention and 1-aryl-4-nitrosopyrazoles have been applied repeatedly in a bland base to the shaved skin of the guinea-pig, have confirmed that the former do not possess to a significant degree the undesirable local toxic effects of the latter. In applicant's own experience in the laboratory severe cases of dermatitis caused by 1-phenyl - 1:5 - dimethyl - 4 - nitrosopyrazole (J. 55) and 1 - 4' - chlorophenyl 3:5 - dimethyl - 4 - nitrosopyrazole (J. 49) have been encountered, while in laboratory and field work with the compounds of the invention no cases of dermatitis have been reported. The 1-cyclohexyl compound of the invention constitutes the preferred compound by reason of the especially low phytotoxicity which practical experience has demonstrated it to possess.

According to a further aspect of this invention there are provided fungicidal compositions such as dusts, dispersions and emulsions, which comprise one or more of the compounds of the foregoing formula in association with one or more solid or liquid diluents of the types commonly used in fungicidal compositions. In the said compositions, there may also be incorporated one or more substances known to be active as fungicides, bactericides, insecticides, fertilisers or plant-growth regulating agents.

Examples of typical fungicidal compositions according to the invention are:

(a) Wettable powders comprising the active material dispersed in a concentration of, for example up to 50% w./w. in an inert absorbent carrier such a silicaceous earth together with an ionic or non-ionic wetting and/or dispersing agent such as an alkali metal salt of a long chain aliphatic sulphate, a partly neutralised sulphuric acid derivative of a petroleum oil or of naturally occurring glycerides or a condensation product of an alkylene oxide with an organic acid.

(b) Self-emulsifying concentrates comprising the active material in solution in a concentration of, for example, up to 80% w./v. in a suitable solvent such as an aromatic hydrocarbon (e. g. xylene), solvent naphtha or a mineral oil together with an ionic or non-ionic wetting and/or dispersing agent.

(c) Dusts obtained by dispersing the active material in sufficient of an inert absorbent carrier to form a free-flowing powder and diluting this with one or more inert carriers such as talc, diatomaceous earths, wood-flours and clays.

(d) Compositions of the active material formulated in the manner commonly employed for the preparation of fungicidal smokes, dusts and aerosols.

The concentrated compositions described under (a) and (b) yield, on dilution with water until the concentration of the active material is, for example, from 0.025% to 0.4% w./v., stable suspensions and emulsions respectively which are for use in the form of a spray.

According to a further feature of the invention, the aforesaid new nitrosopyrazoles are prepared by nitrosating acetylacetone and condensing the resultant isonitrosoketone

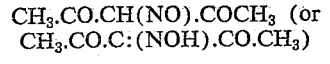

with cyclopentylhydrazine, cyclohexylhydrazine or cycloheptylhydrazine respectively.

The invention is illustrated by the following examples.

Example I

A solution of isonitrosoacetylacetone (25.8 g.) in water (100 ml.) was added dropwise with stirring to an ice-cooled solution (temp. >10° C.) of cyclohexylhydrazine hydrochloride (31 g.) in water (300 ml.). Stirring was continued for a further 2 hours when the solid nitrosopyrazole was collected and washed with water. The product thus obtained is sufficiently pure for the preparation of compositions for horticultural use but may be further purified if required by recrystallisation from ethanol or petroleum-ether (B. P. 60–80° C.) to give turquoise needles, M. P. 144–145° C.

The intermediate cyclohexylhydrazine may be prepared as follows:

Cyclohexanone (49 g.) was dissolved with cooling in a solution of hydrazine hydrate (80%: 32 ml.) in hydrochloric acid (d. 1.16: 50 ml.). The solution was diluted with water (200 ml.) and hydrogenated at a pressure of 70 lbs. per sq. in. in the presence of chloroplatinic acid (10%: 10 ml.) and gum-arabic (1.0 g.). Reduction was complete in 20 minutes. The residual solid was collected and the filtrate evaporated to dryness in vacuo. The combined solids may be crystallised from ethanol to give the hydrazine hydrochloride as a yellowish or colourless solid, the M. P. of which varies from 88° to 110° C. according to the rate of heating.

The hydrazine hydrate-hydrochloric acid mixture may be replaced by an equivalent amount of an aqueous solution of a hydrazine salt, e. g. hydrazine hydrochloride or hydrazine sulphate.

Example II 1-cyclopentyl-3:5-dimethyl-4-nitrosopyrazole was prepared in a similar manner from isonitrosoacetylacetone and cyclopentylhydrazine hydrochloride. The torquoise solid thus obtained is sufficiently pure for many purposes but may be recrystallised from petroleum-ether (B. P. 40–60° C.) to give blue prisms, M. P. 79–80° C.

Cyclopentylhydrazine hydrochloride, M. P. 96–99° C., was prepared in a manner analogous to that described in the previous example.

Example III 1-cycloheptyl-3:5-dimethyl-4-nitrosopyrazole, blue needles, M. P. 89–90° C. (from petroleum ether, B. P. 60–80° C.) was similarly prepared from isonitrosoacetylacetone and cycloheptylhydrazine hydrochloride.

The latter, prepared in a manner analogous to that described above, may best be characterised as the colourless base, B. P. 114–117° C./25 mm. Hg.

Example IV

The fungicidal activities of the new nitrosopyrazoles against spores of Botrytis cinerea, Sclerotinea laxa and Venturia inaequalis were determined and compared with those of 1-phenyl-3:5-dimethyl-4-nitrosopyrazole (J. 55) and N-trichloromethylthio-tetrahydrophthalimide (Captan) as follows:

Spores of the test organisms were incubated in solutions or suspensions of the compounds under test and after 16 hours a count was made of the germination of the spores. The following table shows the minimum inhibitory concentrations of the test compounds:

| Compound | Minimum concentration causing 100% inhibition of spore germination, p. p. m. |
| --- | --- |
| 1-cyclopentyl-3:5-dimethyl-4-nitrosopyrazole | 0.08 |
| 1-cyclohexyl-3:5-dimethyl-4-nitrosopyrazole | 0.008 |
| 1-cycloheptyl-3:5-dimethyl-4-nitrosopyrazole | 0.008 |
| J. 55 | 0.08 |
| Captan | 0.8 |

Example V

The phytotoxicity of the test compounds was determined by spraying them on young tomato plants as a 0.2% aqueous suspension and assessing the damage at intervals up to ten days after spraying. Similar tests were carried out on apple trees. It was surprisingly found that, while 1-cyclopentyl-3:5-dimethyl-4-nitrosopyrazole caused severe scorch and reduced growth of the tomato plants and the corresponding cycloheptyl derivative severely damaged the apple trees, the cyclohexyl derivative caused only very slight scorching and no reduction of growth in the tomato plants and was without visible damaging effect upon the apple trees. For this reason, the cyclohexyl derivative is to be preferred.

Example VI

Eight replicate Broad Bean plants (Vicea fabae) were sprayed with aqueous suspensions of the test compounds in concentrations ranging from 0.02 to 0.0008% of the active compound. The plants were infected with a fungus spore suspension of Botrytis fabae and activity was assessed by counting the numbers of infected leaflets on treated and unsprayed control plants. Results are expressed as the percentage of inhibition of lesions by comparison with the unsprayed controls in the following table:

| Compound | Percent inhibition of lesions at given percent concentration of active compound | | |
| --- | --- | --- | --- |
| | 0.02 | 0.004 | 0.0008 |
| 1-cyclohexyl-3:5-dimethyl-4-nitrosopyrazole | 96 | 46 | 34 |
| 1-cycloheptyl-3:5-dimethyl-4-nitrosopyrazole | 92 | 33 | 21 |
| Captan | 90 | 39 | 42 |

The comparison compound J. 55 was not tested in the field on account of its marked tendency to cause dermatitis.

Example VII

The activities of the test compounds against a number of fungi pathogenic to humans and animals were determined by incorporating the compounds in maltose agar in a range of serial dilutions, inoculating slopes with the fungi under examination, incubating the cultures for 5 days at 30° C. and observing the minimal inhibitory concentration in each case. The results obtained are summarised in the following table:

| Organism | Test Compound (minimal inhibitory concentration in μ g./ml.) | |
| --- | --- | --- |
| | J. 55 | 1-cyclohexylderivative |
| Microsporum gypseum | 2.0 | 1.0 |
| Microsporum audouini | 4.0 | 1.0 |
| Trichophyton mentagrophytes | 15.0 | 1.0 |
| Trichophyton rubrum | 1.0 | 1.0 |
| Candida albicans | 125.0 | 1.0 |
| Aspergillus fumigatus | 2.0 | 1.0 |
| Blastomyces dermatitidis | 2.0 | 1.0 |
| Cryptococcus neoformans | 1.0 | 0.5 |

We claim:

1. A member of the class consisting of the 4-nitrosopyrazoles of the formula:

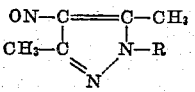

wherein R represents a member of the class consisting of the cyclopentyl, cyclohexyl and cycloheptyl radicals.

2. 1-cyclopentyl-3:5-dimethyl-4-nitrosopyrazole.
3. 1-cyclohexyl-3:5-dimethyl-4-nitrosopyrazole.
4. 1-cycloheptyl-3:5-dimethyl-4-nitrosopyrazole.
5. The process of controlling fungus growth on living plants which comprises applying to the plant a fungicidal composition having as an active ingredient a member of the class consisting of the 4-nitrosopyrazoles of the formula:

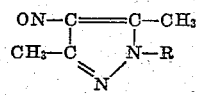

wherein R represents a member of the class consisting of the cyclopentyl, cyclohexyl and cycloheptyl radicals.

6. The process of controlling fungus growth on living plants which comprises applying to the plant a fungicidal composition having as an active ingredient 1-cyclopentyl-3:5-dimethyl-4-nitrosopyrazole.

7. The process of controlling fungus growth on living plants which comprises applying to the plant a fungicidal composition having as an active ingredient 1-cyclohexyl-3:5-dimethyl-4-nitrosopyrazole.

8. The process of controlling fungus growth on living plants which comprises applying to the plant a fungicidal composition having as an active ingredient 1-cycloheptyl-3:5-dimethyl-4-nitrosopyrazole.

References Cited in the file of this patent

UNITED STATES PATENTS 2,751,395    Freeman    June 19, 1956

OTHER REFERENCES

McNew et al.: Chem. Abstracts, vol. 44, cols. 4183–4 (1950).